United States Patent [19]

Ashe

[11] Patent Number: 6,070,799
[45] Date of Patent: Jun. 6, 2000

[54] COPY PROTECTION FOR A RECORDABLE MEDIUM AND FOR CONTROLLING A RECORDER

[75] Inventor: Philip R. Ashe, Hilton, N.Y.

[73] Assignee: Eastman Kodak Company, Rochester, N.Y.

[21] Appl. No.: 08/902,473

[22] Filed: Jul. 29, 1997

Related U.S. Application Data

[60] Provisional application No. 60/034,654, Jan. 8, 1997.

[51] Int. Cl.[7] ........................................ G06K 7/10
[52] U.S. Cl. ........................ 235/462.01; 369/84
[58] Field of Search ..................... 235/454, 375, 235/470, 462.01, 462.03; 369/47, 52, 58, 84

[56] References Cited

U.S. PATENT DOCUMENTS

| | | | |
|---|---|---|---|
| 5,231,546 | 7/1993 | Shimada | 360/60 |
| 5,274,623 | 12/1993 | Usami et al. | 369/275.1 |
| 5,430,281 | 7/1995 | Lentz et al. | 235/454 |
| 5,489,768 | 2/1996 | Brownstein et al. | 235/414 |
| 5,572,589 | 11/1996 | Waters et al. | 380/4 |
| 5,650,991 | 7/1997 | Fujiie | 369/275.4 |
| 5,706,047 | 1/1998 | Lentz et al. | 347/262 |
| 5,729,516 | 3/1998 | Tozaki et al. | 369/58 |

*Primary Examiner*—Donald Hajec
*Assistant Examiner*—Daniel H. Sherr
*Attorney, Agent, or Firm*—Raymond L. Owens

[57] ABSTRACT

Copy protection for an original recordable medium such as an optical disk having at least one recording surface which records digital information, including the digital information having a title ID code which identifies the digital information; and a copy classification code for the digital information which indicates to a recorder whether it is prohibited from making copies, permitted to make only a single copy or does not restrict the number of copies to be made.

2 Claims, 3 Drawing Sheets

COPY PROTECTION FOR A RECORDABLE MEDIUM AND FOR CONTROLLING A RECORDER

CROSS REFERENCE TO RELATED APPLICATION

Reference is made to and priority claimed from U.S. Provisional Application Ser. No. 60/034,654, filed Jan. 8, 1997, entitled Copy Protection For a Recordable Medium and For Controlling a Recorder.

FIELD OF THE INVENTION

The present invention relates to digital recording medium, such as optical disks, and more particularly, to protection schemes for limiting the number of copies of recorded data that can be made.

BACKGROUND OF THE INVENTION

It is well known in the industry to record digital information on optical disks. One problem associated with such recording is that of unauthorized copies. A typical optical disk may include a bar code provided near the mounting hole of the optical disk and an area on the disk in which a digital information is recorded. The bar code uniquely identifies the optical disk. A problem with this arrangement is that of unauthorized copies. As industry progresses new disks are being proposed such as the digital video disk (DVD) which could include multiple surfaces for recording information such as movies, games, audio, text, and software. Although copyright protection is available it in and of itself, does not prevent unauthorized copies. A scrambling technique is available, however, they are costly and time consuming and they prohibit copying when it may be desired to have a single copy made.

A CD-ROM or the like is manufactured according to the published standards such as ISO 9660 standards established by International Standard Organization. To prevent illegally copying of information from a legitimate optical disk in conformity with the standards, a copy protection code is preliminarily recorded on the optical disk. Thus, an optical disk containing such a copy protection code is judged to be legitimate. On the other hand, an optical disk lacking a copy protection code is judged to be illegal. The effect of such a copy protection method is limited for the following reason. When all information on a legitimate optical disk is copied and transferred to another optical disk (a second optical disk), the second optical disk can also be used as a legitimate optical disk.

Another solution for disk copy protection is to use a hardware key or a special data disk referred to as a key disk for the protection. However, this method requires additional medium for carrying the key in the form of hardware or separate disk which increase the cost and gives users a potential problem that the recording medium is impossible to be used when breakage of the hardware key, the key disk or missing of the key disk occurs.

Another solution, presented in U.S. Pat. No. 5,572,589, is to serialize disks by physically damaging a portion of the disc to create a pattern of damage. The pattern of damage is encoded in an identifying value and the disc is marked with the identifying value to distinguish the disc from other discs. The disadvantage of this method is that it requires scarifying the disk capacity by damaging useful recording area.

Presently, there are many activities in standardization of new generation of optical disk, called digital video disks (DVD). The situation now is different from one when compact disk (CD) standards were to be accepted, since in near future the variety of media will appear that will allow an ordinary user, with a personal computer (PC), and a general purpose software, to record his own disks. So, the DVD drive must contain more sophisticated copy protection mechanisms compared to CD drive.

One way to protect data of being copied on another disk is to record the copy protection code on a separate area on a disk where optical head cannot scan it and to use this code as a key to encrypt the user data before recording.

U.S. Pat. No. 5,274,623 discloses an optical disk defining a central mounting opening and having top and bottom surfaces, wherein information is recorded in a recording area which is read from the top surface of the disk. Encryption key is recorded on the outer peripheral edge of the optical disk in the form of a serrated pattern perpendicular to the surface of recording layer. The problem with this arrangement is that it is difficult to form the serrated pattern defining the encryption key on the outer peripheral edge during manufacture and also to provide the necessary space to read such key by either a writer or a reader.

Commonly Assigned U.S. Pat. No. 5,430,281 discloses an optical disk media having an identification code embedded therein called the bar code. However the bar code is not used for the encrypting the data to be recorded to the disk and decrypting the data read out from the disk.

Commonly Assigned U.S. Pat. No. 5,489,768 discloses an optical disk with bar codes, wherein the bar codes are used to prevent inappropriate files from being stored on the medium by preventing an unauthorized system attempting to interact with the storage medium. Although bar codes disclosed in this patent are not used for the encryption of the data to be recorded on the disk, they obviously can be used in this purpose.

SUMMARY OF THE INVENTION

It is an object of the present invention to provide a simple, yet effective arrangement for providing copy protection which permits a single copy to be made for information stored on a recording medium, such as an optical disk This object is achieved in copy protection for an original recordable medium such as an optical disk having at least one recording surface which records digital information, comprising:

(a) the digital information having a title ID code which identifies the digital information; and (b) a copy classification code for the digital information which indicates to a recorder whether it is prohibited from making copies, permitted to make only a single copy or does not restrict the number of copies to be made.

The object is further achieved in an apparatus for copying digital information onto a recordable disk from an original disk having at least one recording surface which has a tide ID that identifies the digital information, and having a copy classification code for the digital information identified by the title ID which indicates to a recorder whether it is prohibited from making copies, permitted to make only a single copy from an original or does not restrict the number of copies to be made.

It is an advantage of the present invention to make use of bar code technology for providing copy protection for recording medium, such as optical disks.

It is a further advantage that the present invention can be effectively used with an existing optical disk and also in the proposed DVD disk which may have multiple recording surfaces.

It is a feature of the present invention that copy protection including single copy capability can be simply yet effectively realized.

DETAILED DESCRIPTION OF THE PREFERRED EMBODIMENT

Figure 1:
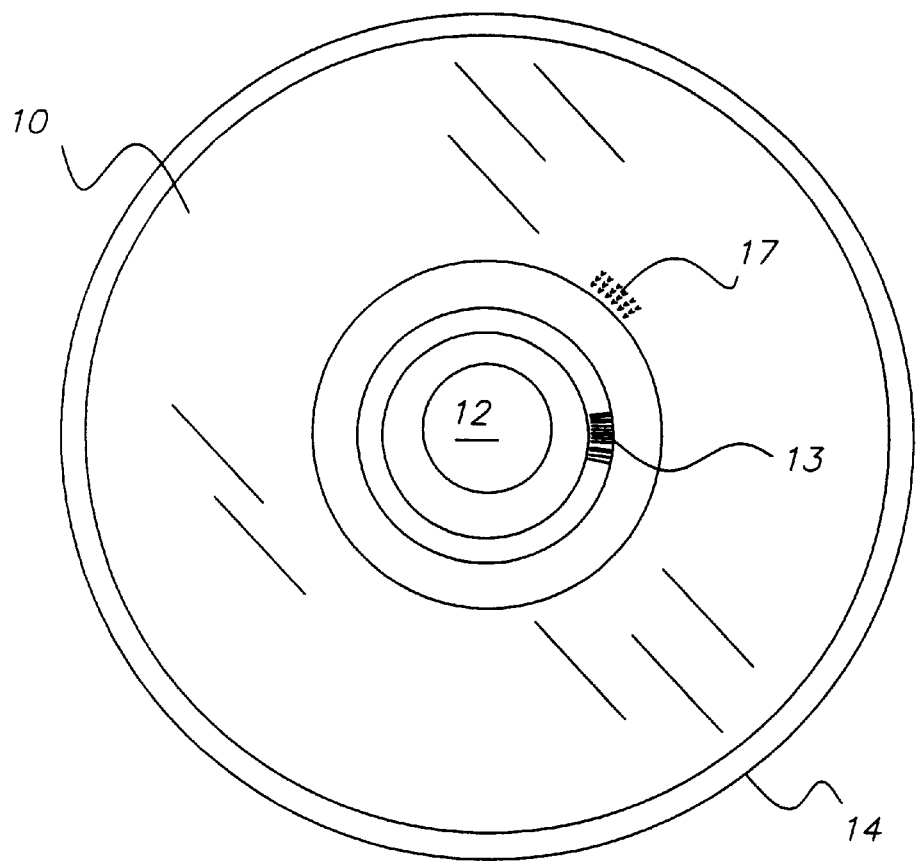
FIG. 1 shows an arrangement for the situation where an optical disk original classification code is set to no copy.
Figure 2:
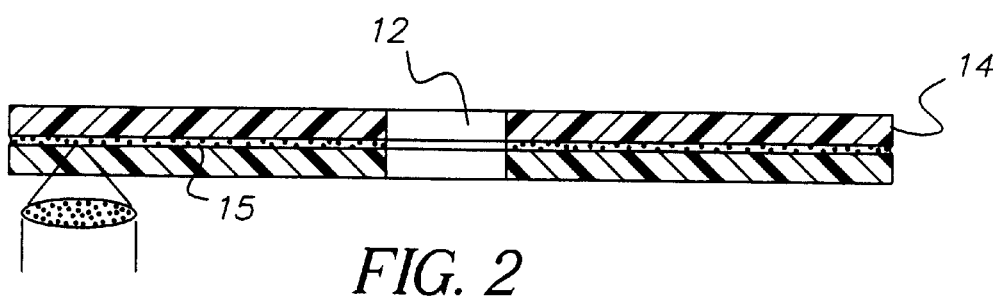
FIG. 2 shows a cross-section of the disk of FIG. 1.

Turning now to FIGS. 1 and 2 which show an original optical disk 10. By use of the term "original" it is meant that this is a disk which will be sold to a user. It has copy protection. The original optical disk 10 may have a bar code with an unique disk series of disk identification stripes 13 which would be located adjacent to central mounting opening 12. The original optical disk 10 includes a mounting opening 12 and has an outer edge 14. The original optical disk 10 can be either performed by injection molding process or can be made by a recorder as is well known in the art. The original optical disk 10 has at least one recording layer 15 which records digital information. In accordance with the present invention the digital information has a title identifier (ID) code which identifies the digital information; and a copy classification code for the digital information which is adapted to indicate to a recorder 31 (See FIG. 3) three cases (1) whether it is prohibited from making copies, (2) permitted to make only a single copy or (3) does not restrict the number of copies to be made. It will be understood that the a writer 31 shown in FIG. 3 includes a reader 30 which reads the digital information and sends the copy classification code and title ID code along with the digital information to a digital copy protection processor 32. The writer 31 is adapted to send a request to the reader 30 to initiate this sequence. The writer 31 includes apparatus 34 for recording digital information.

In the first case the recorder 31 requests the copy classification code and the title ID. The recorder 31 receives the copy classification code and title ID and processes this information. The recorder 31 is prohibited from recording.

In the second case, where the original copy classification code has been set to limit copying to a single copy for personal use only, the reader 30 receives the request from the recorder 31 and sends the copy classification code and title ID. The recorder 31 requests the copy classification code and the information in the title ID. The recorder 31 accepts the single copy classification code and resets the copy classification code to "single copy". A digital copy protection processor 32 cause a code bar ready to read the unique disk ID 13 in the copy protection circuit. When the processor 32 finds a unique disk ID 13 and concludes that this is the original the process intervenes. The recorder 31 then records the copy classification code as noted above along with the title ID followed by the target disc number (such as 1 2 3 4) from the target machine readable bar code. This information is recorded in the title ID field at the beginning of the disc. The contents can now be copied. If a second copy is attempted the system will deny the request. Once the system is reset it will permit the operation to repeat. This cumbersome operation is a deterrent for making multiple copies.

It will be understood that in the situation where a user is attempting to make a copy from a disk which was an allowed single copy. Recording is not allowed.

In the third case where copying is not restricted. The original tide ID is used along with the unique disk ID 13 for each copy.

Figure 3:
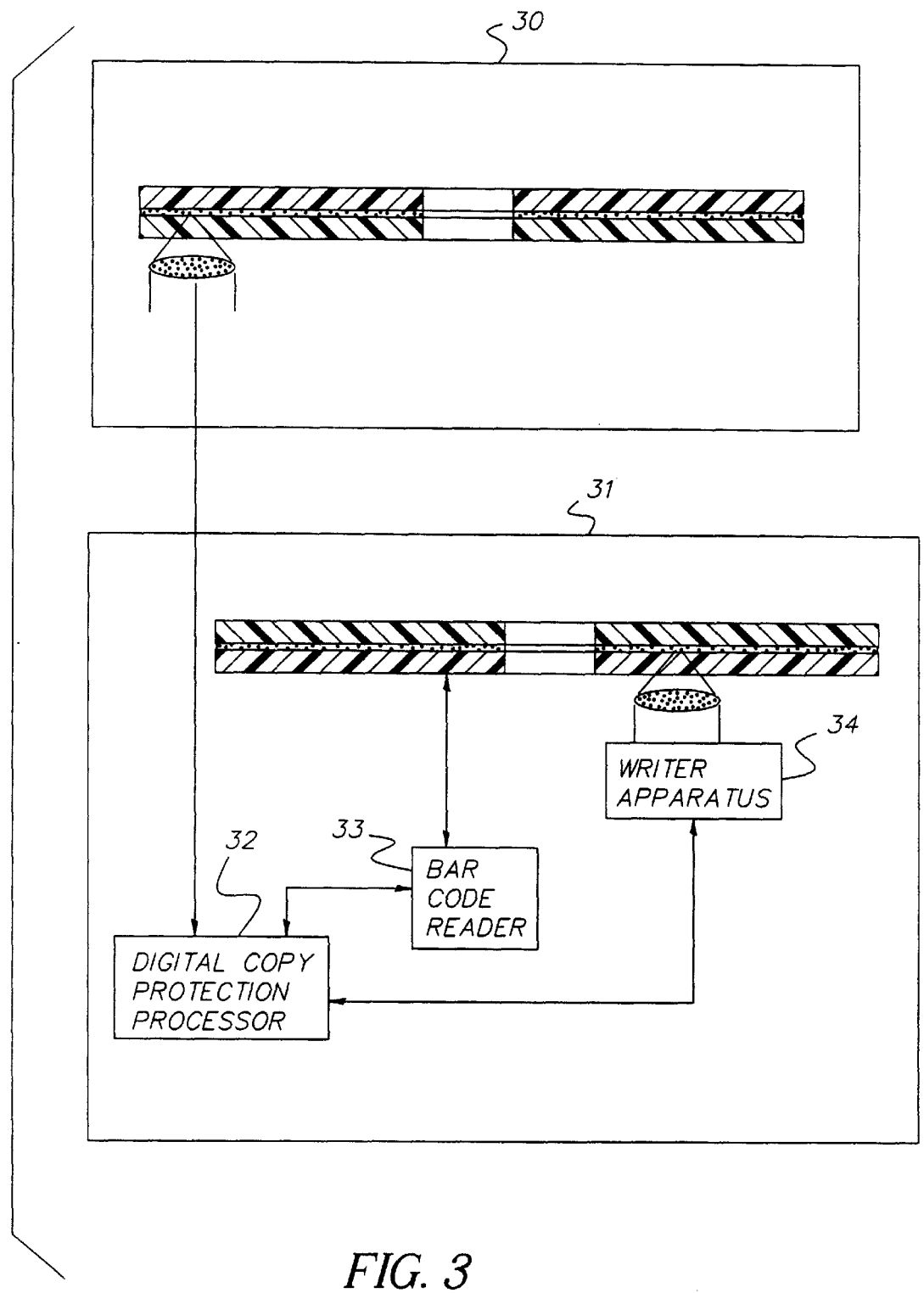
FIG. 3 is a block diagram of the recorder which reads optical disks having copy protection in accordance with the present invention.
Figure 4:
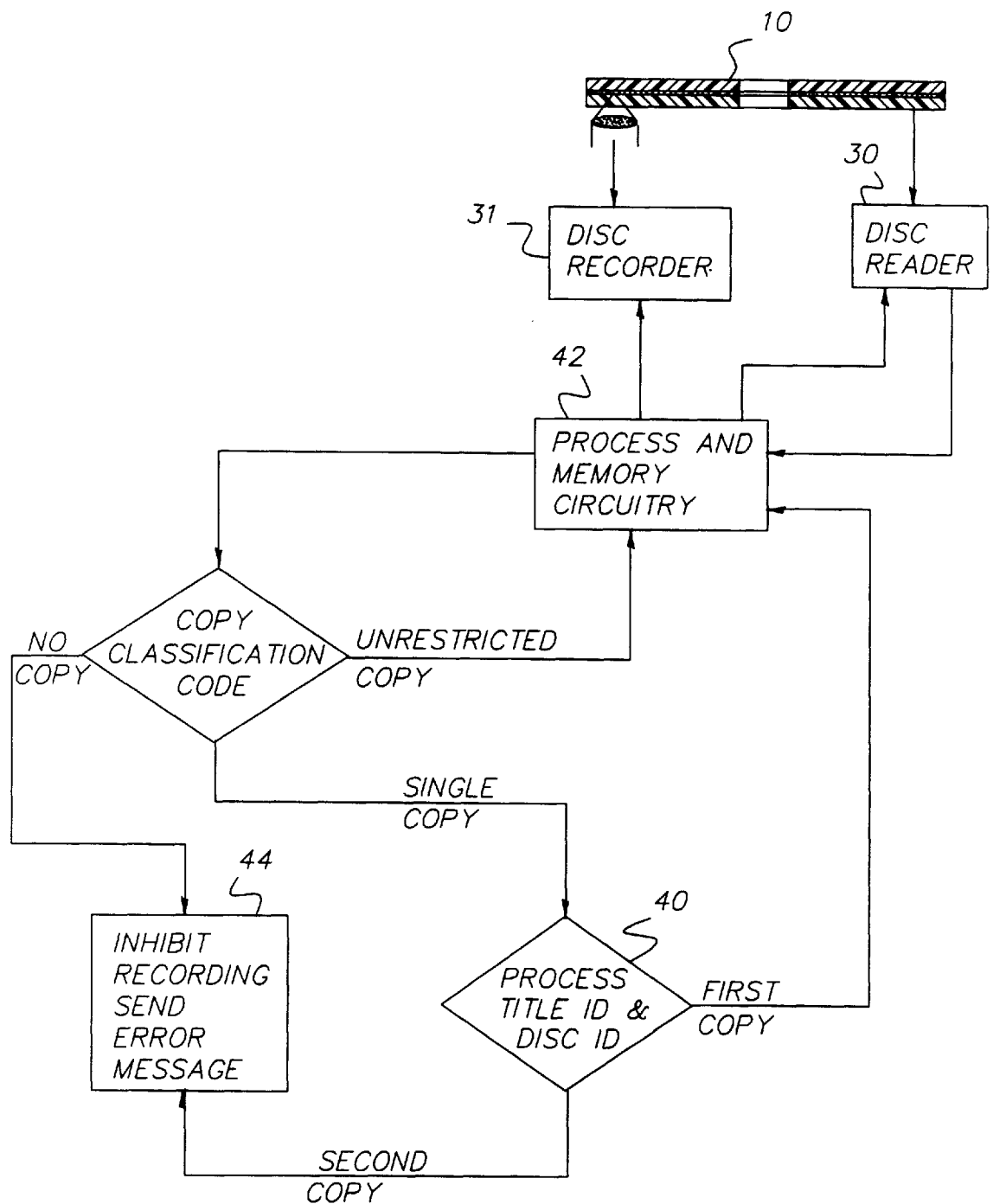
FIG. 4 is a logic flow chart for the recorder of FIG. 3 which shows the various modes of operation using copy protection in accordance with the present invention.

Turning now to FIG. 3 where a flow chart of the copy protection algorithm which can be used is shown. The flow chart blocks are appropriately labeled to show the operation of the FIG. 3 arrangement for all cases of operation.

A disk, whether an original optical disk 10 or a copy is read by disk reader 30 which reads the digital information. The writer 31 writes digital information on the original optical disk 10. Only one disk is shown for clarity of information although it should be clear that the disk reader 34 will read from a second disk. The disk reader 30 reads classification codes, tide ID and disk ID information to the digital copy protection processor 32 to process and memory circuit 42. If the classification code is unrestricted copy the process and memory circuitry causes the disk reader 30 to read digital information and disk recorder 31 to write such information on the copy disk. If no copy is to be made then block 44 inhibits recording and sends an error message to a user. If a single copy is to be made then the process and memory is indicated to cause a single copy to be made and to change the classification code to indicate that the single copy has been made. These data are recorded on the original optical disk 10.

If the classification code indicates a single copy already has been made, then the block 44 again inhibits recording and sends an error message.

The invention has been described in detail with particular reference to certain preferred embodiments thereof, but it will be understood that variations and modifications can be effected within the spirit and scope of the invention.

Parts List 10 original optical disk
12 central mounting opening
13 disk identification stripes
13 unique disk ID
14 outer edge
15 recording layer
30 reader
31 recorder
31 writer
32 copy protection processor
34 apparatus for recording digital information
42 process and memory circuit
44 block

What is claimed is:

1. Apparatus for copying digital information onto a first recordable disk from an original disk having at least one recording surface which has a title ID that identifies the digital information, and having a copy classification code for the digital information identified by the title ID which indicates to a recorder whether the recorder is prohibited from making copies, permitted to make only a single copy from an original or does not restrict the number of copies to be made in a copying session, comprising:

(a) means for reading and storing a unique code from a bar code on the recordable medium, the unique code identifying the original disk;

(b) means for reading the title ID and the copy classification code from the original disk and for storing the title ID and the copy classification code on the first recordable disk responsive to the unique code; and (c) means responsive to the unique code, the title ID and the copy classification code for controlling the recorder including means responsive to the copy classification code for preventing the recorder from making a copy onto a second recordable disk in the copying session.

2. Apparatus for copying digital information onto a recordable disk from an original disk having at least one recording surface which has a title ID that identifies the digital information, and having a copy classification code for the digital information identified by the title ID which indicates to a recorder whether it is prohibited from making copies, permitted to make only a single copy from an original or does not restrict the number of copies to be made in a session, comprising:

(a) means for reading and storing a unique code from a bar code of a disk, the unique code identifying the original disk;

(b) means for reading the title ID and the copy classification code from the original disk and for storing them; and (c) means responsive to the unique code, the title ID and the copy classification code for controlling the recorder including means responsive to the copy classification code indicating that the recorder is permitted to make only a single copy from the original disk in the session including:

(i) means for reading a unique ID number corresponding to the recordable disk;

(ii) means for causing the recorder to write on the recordable disk the title ID of the original disk, unique ID number of the recordable disk and the original copy classification code so that if a copy is attempted to be made from the recordable disk the reader will have information indicating that it can no longer making a copy; and (iii) means for writing the digital information onto the recordable disk.

* * * * *